United States Patent [19]
Lardeau

[11] 3,785,265
[45] Jan. 15, 1974

[54] IRIS DIAPHRAGM

[75] Inventor: Jacques Lardeau, Rosny-sous-Bois, France

[73] Assignee: Societe d'Optique, Precision, Electronique et Mecanique-Sopelem, Paris, France

[22] Filed: May 25, 1973

[21] Appl. No.: 363,866

[30] Foreign Application Priority Data
July 6, 1972  France .............................. 72.24426

[52] U.S. Cl. ................................................. 95/64 R
[51] Int. Cl. ............................................. G03b 9/06
[58] Field of Search ...................... 95/64 R; 352/141

[56] References Cited
UNITED STATES PATENTS

| 3,700,314 | 10/1972 | Busby, Jr. | 95/64 R |
| 2,944,477 | 7/1960 | Tesch | 95/64 R |
| 3,098,421 | 7/1963 | O'Hara | 95/64 R |
| 3,584,558 | 6/1971 | Easterly | 95/64 R |
| 3,589,258 | 6/1971 | Koeber | 352/141 X |

Primary Examiner—Joseph E. Peters, Jr.
Attorney—William B. Kerkam, Jr.

[57] ABSTRACT

An iris diaphragm includes shutter blades moved by a conventional control member during a first phase of adjustment to reduce the aperture to a size at which diffraction effects are still unimportant. In a second phase of adjustment the shutter blades are stationary and a transparent support member is moved to introduce increasingly dense portions of a graduated filter into the optical path. Light control over a range of 1:1,000,000 may thus be obtained. There may follow a third phase in which the shutter blades again move to reduce the aperture to zero. The blades and the filter support may be placed on opposite sides of a permanent stop and actuated by respective control members coupled to a common setting ring. Alternatively the blades and filter support may be on the same side of the stop and actuated by a common control member. The filter support may be introduced into the optical path only after the first phase has ended, or a transparent portion thereof may be always in the optical path, the filter-carrying portion being brought into action only during the second phase.

10 Claims, 9 Drawing Figures

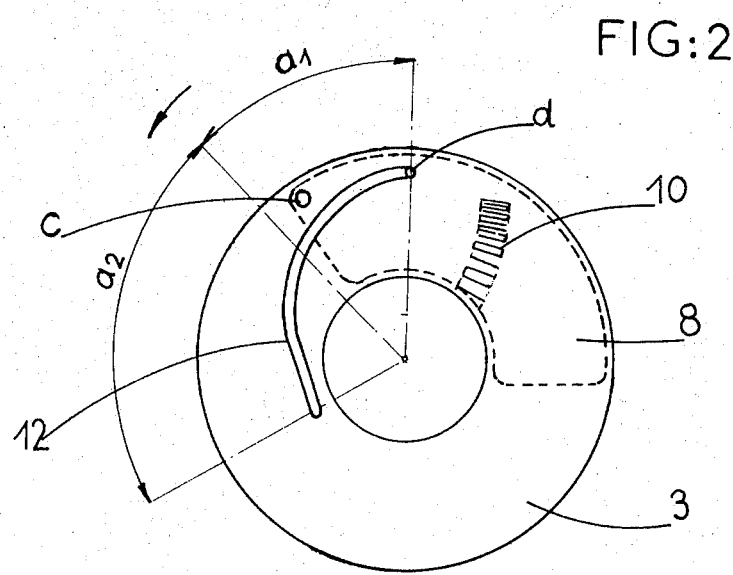
FIG:2
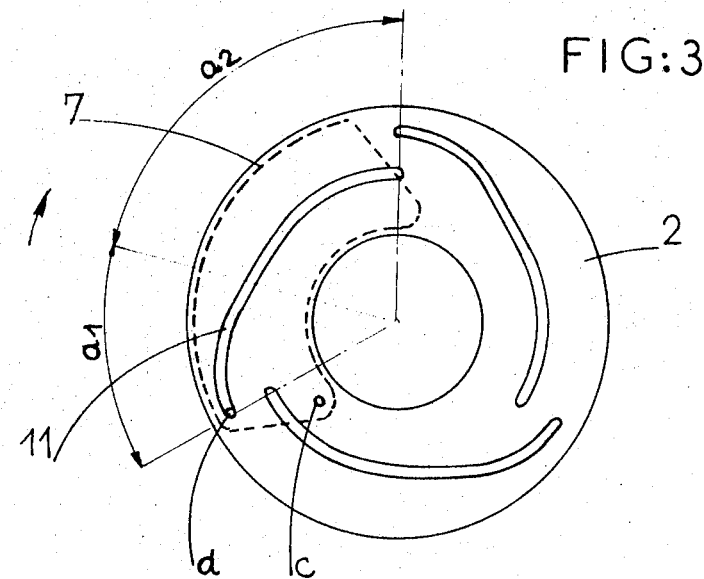
FIG:3

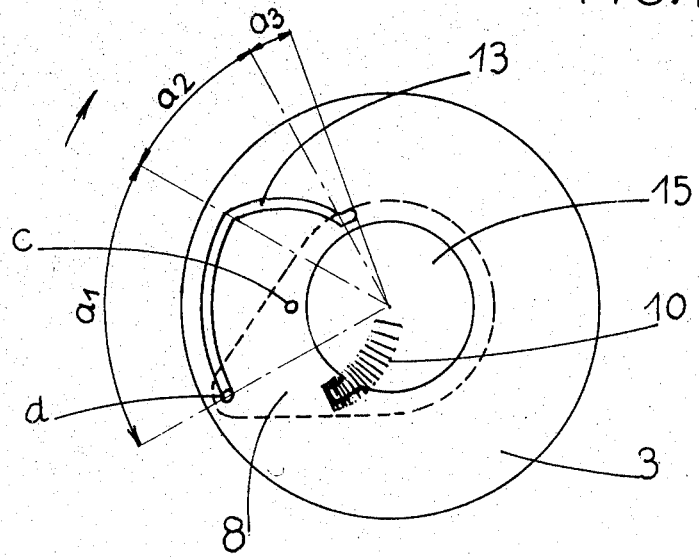
FIG:4
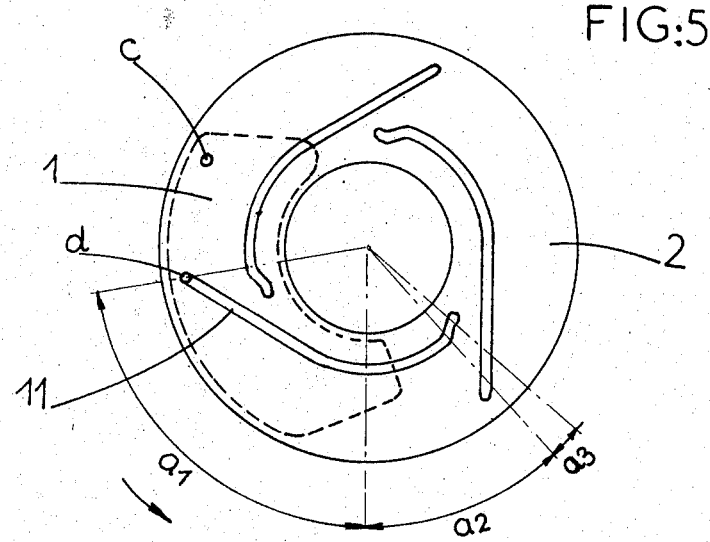
FIG:5

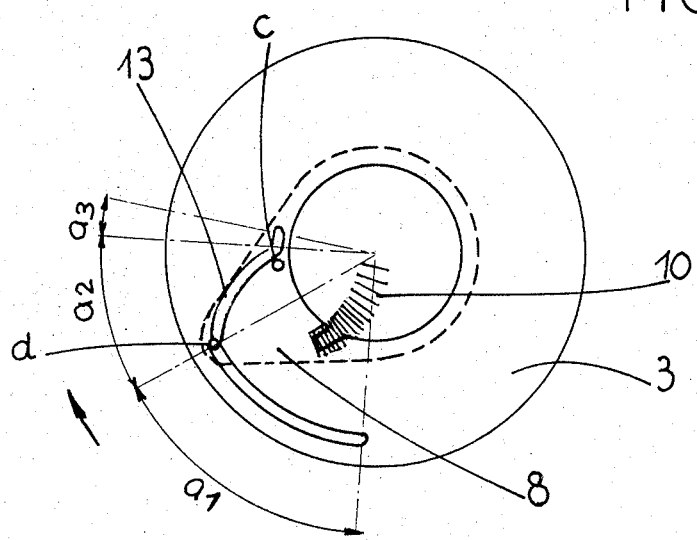
FIG:6
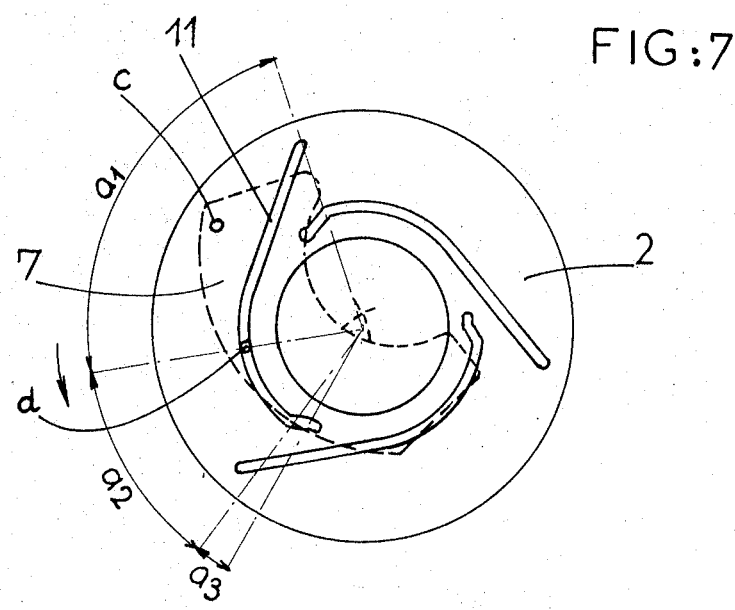
FIG:7

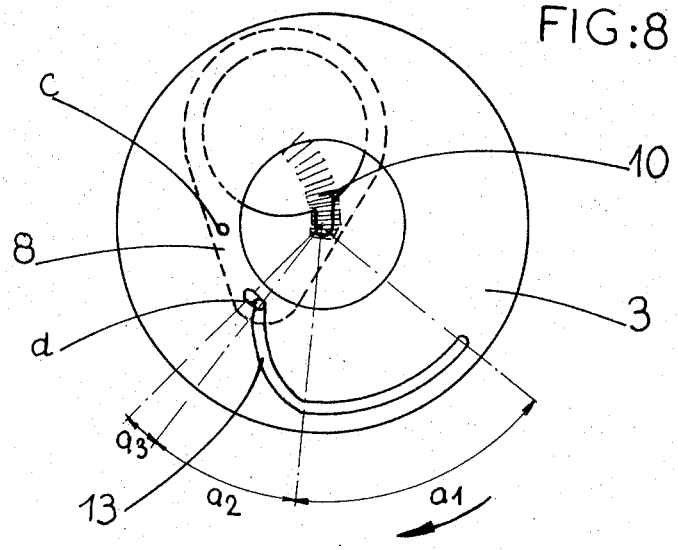
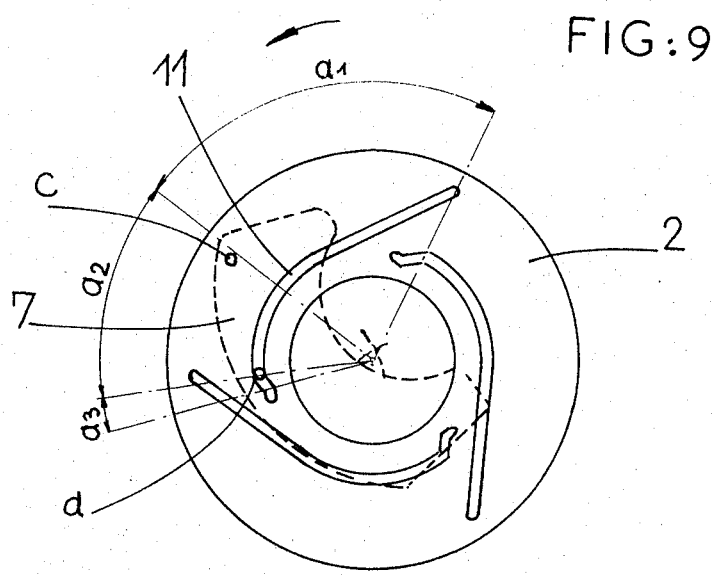

IRIS DIAPHRAGM

BACKGROUND OF THE INVENTION

This invention relates to iris diaphragms with very large aperture ratios, intended more particularly for use with objective lenses for photographic, cinematographic or television cameras.

In the standard range of diaphragms with apertures $f:1, f:1.4, f:2, \ldots$ it is difficult to employ diaphragms with apertures of less than $f:32$ without seriously degrading the image because of diffraction phenomena. The use of the ten diaphragms of the standard range with apertures between $f:1$ and $f:32$ allows the accommodation of variations in brightness in a ratio of about 1:1000, but it is often necessary to accept a lens with a maximum aperture $f:2$ and a minimum aperture of $f:22$; it is thus possible to use only seven standard apertures covering brightnesses in the ratio of 1:128.

On the other hand, the appearance on the market of more and more sensitive film and of new television camera tubes, now permits shooting of pictures with illuminations as low as 0.01 Lux. It will thus be seen that if it is wished to record pictures equally well with an illumination such as 0.01 Lux as with an illumination of 100,000 Lux given by very bright sunlight, it is necessary to accept limiting illuminations varying in a ratio of 1 to 1,000,000.

To accommodate such wide limits of illumination, without being troubled by diffraction phenomena at very low apertures, arrangements have already been proposed including the interposition of neutral filters in the optical path, allowing the limits of variation given by the diaphragm to be increased. In such an arrangement the diaphragm is initially closed without a filter, then the filter is interposed the same time as the diaphragm is re-set to its full aperture, thus providing a new range of variation.

However, a certain discontinuity results at the moment at which the filter is introduced into the optical path, which constitutes a serious inconvenience in cases, for example, of continuous shooting by means of a cinematographic or television camera.

Another proposed arrangement is known as a "graduated bulls eye," which provides concentric surfaces of different optical densities, the darkest being at the centre, on an optical surface adjacent to the diaphragm; as the diaphragm is closed the diameter of the iris allows light to pass only by way of darker and darker surfaces, which leads to a progressive attenuation of the transmitted light. This arrangement, however, still presents the disadvantage of giving rise to diffraction phenomena as the diaphragm approaches a sufficiently dark surface of the filter; in this case the diffraction may be even more troublesome than in the case of a small aperture, because of the form of the diffraction pattern.

Another known arrangement comprises a neutral filter in the form of a disc graduated in accordance with an angular law, rotatably mounted in front of or behind the objective or in the plane of the lens stop. This solution is theoretically sound and permits large variations of illumination to be accommodated, but in this case the lens always operates at its full aperture and aberrations are not suppressed, unless a second control device is provided, which increases the cost. In addition, the filter disc must have a diameter which is more than twice the diameter of the stop or the diameter of the lens field in front of or behind the lens, and this leads to an undesirable increase in the bulk of the lens assembly.

It is an object of the present invention to provide iris shutter means capable of controlling light intensity over a very wide range of values.

It is a further object of the invention to produce iris shutter means combined with graduated-density filter means in an advantageous manner to provide a wide range of light control.

It is another object of the invention to provide iris diaphragm means including a transparent filter support member movable to introduce a graduated-density filter into the optical path limited by actuation of the iris blades.

It is yet another object of the invention to provide iris diaphragm means in which, after an optical aperture has been reduced to a predetermined size by actuation of the iris blades increasingly dense portions of a graduated-density filter carried upon a transparent support member are introduced into the optical path and wherein, after the portion of the filter of greatest density has been brought into the optical path, the iris blades are again moved to close the aperture completely.

These and other objects and advantages of the invention will become apparent from the following description taken in conjunction with the drawings.

BRIEF DESCRIPTION OF THE DRAWINGS

FIGS. 2 and 3 represent the positions of the diaphragm blades in the embodiment in which the graduated filter is carried by a special blade; and FIGS. 4 to 9 show the arrangement of the blades and of the filter support in the embodiment where the filter is carried on a transparent support, FIGS. 4 and 5 representing the positions at full aperture, FIGS. 6 and 7 showing the positions at the end of the first phase, FIGS. 8 and 9 representing the diaphragm at the end of the second phase of closure.

DESCRIPTION OF THE PREFERRED EMBODIMENTS

Figure 1:
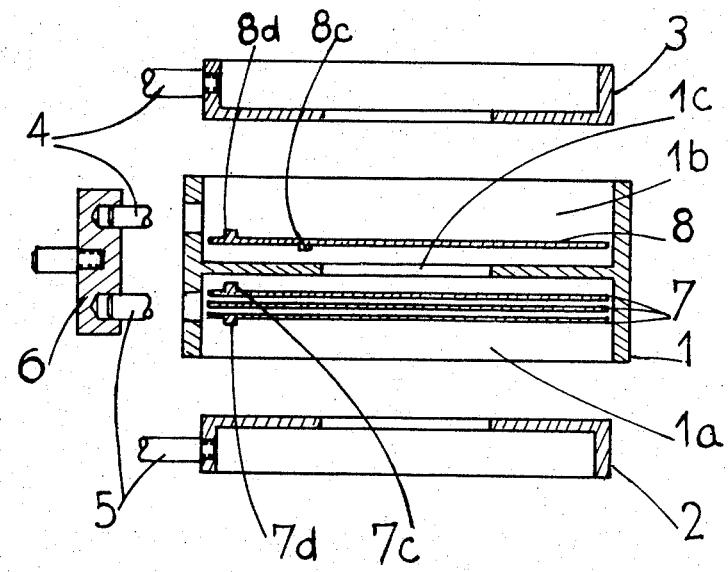
FIG. 1 is a schematic diametral section of a diaphragm assembly in accordance with the invention.

FIG. 1 is an exploded view of the different elements constituting the diaphragm assembly. The casing 1 includes two housings 1a and 1b. Housing 1a encloses the three iris blades 7, each of which includes a pin 7c engaged in an aperture in the base of the casing and forming a pivot axis for the blade; each blade 7 likewise includes a pin 7d which engages in a slot in the control member 2. It will be understood that in its operating position the control member 2 is likewise positioned for rotation within the housing portion 1a of the casing 1. Similarly, there is positioned within the housing portion 1b of he casing 1 a filter-carrying blade 8, pivoted by a pin 8c on the housing base and controlled by a control member 3 which includes a slot in which a pin 8d of the blade 8 engages.

Each of the control members 2 and 3 is connected by the respective one of pins 5 and 4 to a single ring 6 which permits their simultaneous operation. FIG. 1 is a simply schematic representation of the construction of the diaphragm and no particular importance should be attached to the relative positions of the pins 7c, 7d or 8c, 8d, which may vary in accordance with the embodiments which are described below.

Referring now to FIGS. 2 and 3, there may be seen first of all from FIG. 3 the arrangement of the slots in the control member 2 effecting the movement of the blades 7. In this arrangement it is seen that each blade 7, of which one only is represented in the Figure, is pivoted at c to the base of the housing, near the centre of the diaphragm, while the control pin d is disposed at its peripheral portion.

From FIG. 2 may be seen the control member 3 intended to operate the blade 8. This blade is pivoted at c to the base of the housing and the pin d is engaged in the slot 12 in the control member 3. The blade 8 has a shape substantially equivalent to that of the blades 7, but its central portion is cut away to accept a graded filter 10 bounded by two circular arcs centred at c and of which the mean radius is equal to the distance from c to the optical axis of the lens. The most transparent portion of the filter 10 is placed nearest to the optical axis, while the densest portion is placed nearer the periphery of the lens.

FIGS. 2 and 3 represent the diaphragm in its full aperture setting, that is to say, the blades 7 and 8 are positioned entirely outside the orifice 1c in the base of the casing. When the ring 6 is turned to rotate the two control members 2 and 3 in the direction indicated by the arrows A in FIGS. 2 and 3, the forms of the slots 11 and 12 formed respectively in control members 2 and 3 are such that during the first part of the rotation, corresponding to the angle a1, the blades 7 progressively close together to reduce the aperture of the iris, while the blade 8 performs a substantially equivalent movement, the filter 10 being always hidden behind a blade 7. The end of rotation through the angle a1 corresponds to the minimum diaphragm aperture which can be obtained without fear of diffraction phenomena. When rotation is continued beyond the angle a1 it will be seen from FIG. 3 that the slot 11 becomes concentric with the optical axis, so that the blades 7 from then on remain stationary and the diameter of the iris aperture remains unchanged. On the other hand, the slot 12 in control member 3 continues to urge the blade 8 towards the centre and the filter 10 is progressively introduced in front of the iris aperture. The width of the filter 10 is such that it slightly overlaps the diameter of the iris aperture obtained at the end of rotation through the angle a1.

There will now be described, with reference to FIGS. 4 to 9, another embodiment which differs from the preceding embodiment mainly in the fact that the graduated filter 10 of small area is here formed on a transparent support member 15 of large area. In the full-aperture position represented by FIGS. 4 and 5, the blade 8, pivoted at c to the base of the casing and controlled by the pin d engaged in the slot 13, presents the transparent support in front of the whole of the aperture 1c in the casing and the least dense portion of the filter 10 is likewise in the optical passage of the diaphragm. It will be understood, however, that by reason of the small area of the filter 10 the amount of light passing through the aperture is practically unaltered by the presence of the filter 10 in the light path.

When, in order progressively to close the diaphragm, the control members 2 and 3 are actuated, progressive closure of the blades 7 is produced by engagement of the pins d in the slots 11 of the control member 2. Thus there is obtained, by rotation through an angle a1, the minimum aperture compatible with avoidance of diffraction phenomena.

During this rotation through an angle a1 the slot 13 in the control member 3 is concentric with the optical axis of the apparatus and the blade 8 therefore remains stationary. Thus at the end of rotation through the angle a1, the position represented by FIGS. 6 and 7 is reached, in which the blades 7 are closed to a small aperture (for example f:22) and the filter 10 presents in front of this aperture only its almost completely transparent portion.

If the rotation of the control members is continued, it will be seen that during rotation through a further angle a2 it is now the slots 11 of the control member 2 which are concentric with the optical axis, so that the iris aperture is held at the diameter attained at the end of rotation through angle a1. The slot 13 in the control member 3, on the other hand, is formed to rotate the blade 8 so as to present progressively darker and darker zones of the filter 10 in front of the iris aperture. FIGS. 8 and 9 represent the position attained after rotation through the angle a2 yielding in this position an iris aperture sufficiently large to prevent unwanted diffraction phenomena but darkened by the densest portion of the filter 10.

In the particular case shown in the Figures, it will be seen that rotation of the control members 2 and 3 may be continued through a further small angle a3, during which rotation the blade 8 again remains stationary, while the blades 7 resume their inward movement so as completely to close the aperture.

It will be perceived that for a diaphragm thus constructed in accordance with the invention it is easy, for one skilled in the art, to design the slots in the control members in such a manner that the angles a1 and a2 may vary in accordance with the particular application. Thus these angles may readily be determined such that the amount of light transmitted is a linear function of the angle of rotation of the control ring; obviously this must take into account the transmission law of the graduated filter 10.

It may likewise be suitable, in the second embodiment described above, to commence rotation of the blade 8 about its pivot c before the aperture limited by the blades 7 has fully attained its minimum size, so as to avoid a possible discontinuity in the law relating light transmission to the rotation of the control ring.

It will also be understood that the second embodiment described with reference to FIGS. 3 and 4 has the advantage, as compared with the first embodiment described, of not modifying the optical path of the light in passing from the reduction in the aperture by the shutter blades to the reduction of the light transmitted through the filter. Here there is in fact constantly interposed in the path of the light, either the wholly transparent portion of the support member or the portion forming the graduated filter.

The graduated filter used in the embodiments described has a density which increases rapidly and progressively in a quasi-linear manner from transparency to a density of 4 in the darkest zone: this corresponds to the equivalent of about 13 divisions on the standard scale of diaphragms. It is thus seen that even if the iris diaphragm is used only from f:2 to f:22, that is to say over a range of seven stops, the use of the graduated-density filter in the second stage adds the equivalent of 13 stops. It is thus possible, therefore, to obtain a control of the light equivalent to about 20 stops of the standard diaphragm scale, which permits a variation in brightness of about 1:1,000,000 to be accommodated.

It should be noted that the invention is not to be considered as being limited to the embodiments which have been described by way of example, but equally includes other embodiments which differ only in details or which employ equivalent means.

Thus, the blade carrying the filter may alternatively be arranged on the same side of the casing as the blades of the normal diaphragm, with a single control member. In this case the diameter of the casing would simply be slightly increased to avoid interference between the control pins. Such a construction is currently used in the construction of iris diaphragms and the necessary modifications will be apparent to those skilled in the art.

It is also possible to envisage, without departing from the scope of the invention, an embodiment combining the arrangements of the two embodiments described in detail, one part of a graduated filter being, as in the second embodiment, continuously interposed in the optical aperture, but this graduated filter being, as in the first embodiment, completely masked by the normal blades during the first phase of adjustment. Naturally, in this case the support for the graduated filter will be arranged to move at the same time as the normal blades.

What is claimed is:

1. In iris diaphragm means, in combination:
casing means defining an aperture in an optical path;
control means mounted for movement with respect to said casing means;
a plurality of iris blades pivoted to the casing means;
iris drive means coupling said iris blades with said control means whereby in response to a first phase of movement of said control means said blades progressively reduce said aperture to a predetermined size and remain stationary during a second phase of movement of said control means succeeding to said first phase;
a transparent filter support member pivoted to said casing means;
a graduated-density filter on said support member whereby predetermined pivotal movement of said support member introduces increasingly dense portions of said filter into said aperture;
filter drive means coupling said support member with said control means whereby said pivotal movement of said support member is produced in response to said second movement phase of said control means.

2. The invention claimed in claim 1 wherein said iris drive means further responds to a third phase of movement of said control means, following said second phase, by actuating said iris blades progressively to close said aperture, said filter control means being arranged to hold said filter support member stationary during said third phase of movement.

3. The invention claimed in claim 1 wherein said casing means includes a hollow cylindrical portion having medially therein a transverse, centrally apertured portion defining a fixed stop in said optical path, wherein said iris blades are pivoted upon one face of said apertured portion and said iris drive means includes a plurally slotted annular iris drive member mounted for rotating movement within said cylindrical casing portion and wherein said iris blades each have a respective drive pin engaging in a respective one of said iris drive member slots.

4. The invention claimed in claim 3 wherein said filter support member is pivoted at a point upon the face of said apertured casing portion opposite to said one face, wherein said filter drive means includes a slotted annular filter drive member mounted for rotating movement within said cylindrical casing portion and said filter support member has a drive pin engaged in said filter drive member slot.

5. The invention claimed in claim 4 wherein said control means includes a setting ring surrounding said cylindrical casing portion for rotating movement thereabout; said casing portion includes peripherally extending slots and each of said iris drive member and said filter drive member is driving coupled with said setting ring by a respective coupling pin extending radially through a respective one of said slots.

6. The invention claimed in claim 1 wherein said casing means includes a hollow cylindrical portion having therein a transverse centrally apertured portion defining a fixed stop in said optical path, wherein said iris blades and said filter support member are pivoted upon the same face of said apertured casing portion, and wherein said drive means includes a common plurally slotted drive member mounted for rotating movement within said cylindrical casing portion, each of said iris blades and said filter support member having a respective drive pin engaged in a respective one of said driving member slots.

7. The invention claimed in claim 4 wherein said graduated-density filter is bounded by circular arcs centred at said pivot point, wherein the width of said filter is slightly greater than the diameter of said iris aperture of said predetermined size and wherein the mean radius of said filter is equal to the distance from said pivot point to said optical axis.

8. The invention claimed in claim 1 wherein said filter support member has a form similar to that of said iris blades, said filter drive means actuating said filter support member for movement simultaneously with said iris blades during said first phase of movement and producing said predetermined movement of said support member during said second phase or movement.

9. The invention claimed in claim 1 wherein a portion of said transparent filter support member is always disposed in said optical path, wherein at the commencement of said first phase of movement the least dense portions of said filter are disposed within the iris aperture, and wherein said filter drive means is arranged to produce said predetermined movement of said filter support member only after termination of said first phase of movement.

10. The invention claimed in claim 1 wherein a portion of said transparent filter support is always disposed in said optical path, wherein said filter drive means is arranged during said first phase of movement to cause said filter support member to move together with said iris blades, whereby said filter remains outside the iris aperture during this phase of movement, and wherein during said second phase of movement said filter drive means produces said predetermined movement of said filter support member.

* * * * *